US012795745B2

(12) United States Patent
Da Silva et al.

(10) Patent No.: US 12,795,745 B2
(45) Date of Patent: Nov. 10, 2026

(54) BEAM SELECTION DURING RANDOM ACCESS BASED ON PRE-SYNCHRONIZATION

(71) Applicant: TELEFONAKTIEBOLAGET LM ERICSSON (PUBL), Stockholm (SE)

(72) Inventors: Icaro Leonardo Da Silva, Solna (SE); Antonino Orsino, Kirkkonummi (FI); Venkatarao Gonuguntla, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/226,760

(22) Filed: Jun. 3, 2025

(65) Prior Publication Data

US 2025/0301508 A1 Sep. 25, 2025

Related U.S. Application Data

(63) Continuation of application No. PCT/SE2025/050071, filed on Jan. 31, 2025.

(60) Provisional application No. 63/550,361, filed on Feb. 6, 2024.

(51) Int. Cl.
*H04W 74/0833* (2024.01)
*H04B 7/06* (2006.01)

(52) U.S. Cl.
CPC ...... *H04W 74/0833* (2013.01); *H04B 7/0626* (2013.01); *H04B 7/06968* (2023.05)

(58) Field of Classification Search
CPC ............. H04W 74/0833; H04B 7/0626; H04B 7/06968
See application file for complete search history.

(56) References Cited

U.S. PATENT DOCUMENTS

2020/0351954 A1* 11/2020 Turtinen ............ H04B 7/06964
2022/0159727 A1* 5/2022 Turtinen ............... H04W 16/14
2023/0354117 A1 11/2023 Yuan et al.
2024/0334281 A1* 10/2024 Khoshkholgh Dashtaki ............... H04W 36/083
2024/0381190 A1* 11/2024 Bai ................... H04W 36/0058
2024/0430944 A1* 12/2024 Kim ...................... H04W 36/00
(Continued)

FOREIGN PATENT DOCUMENTS

WO 2023016332 A1 2/2023

OTHER PUBLICATIONS

Huawei, et al., "Introduction of NR further mobility enhancements in TS 38.321", 3GPP TSG-RAN WG2 Meeting #124, R2-2314040, Revision of R2-2313680, Nov. 13-17, 2023, 255 Pages, Chicago, US.

(Continued)

*Primary Examiner* — Chuong M Nguyen
(74) *Attorney, Agent, or Firm* — Ericsson Inc.

(57) ABSTRACT

A communication device can activate a transmission configuration indicator, TCI, state of a candidate cell. Subsequent to activating the TCI state of the candidate cell, the communication device can select a beam of the candidate cell as part of a random access, RA, procedure with the candidate cell. The communication device can further select a preamble and a random access channel, RACH, resource based on the beam of the candidate cell. The communication device can further transmit the preamble to the RACH resource.

16 Claims, 10 Drawing Sheets

(56) References Cited

U.S. PATENT DOCUMENTS

| | | | | |
|---|---|---|---|---|
| 2025/0039942 | A1* | 1/2025 | Kung | H04W 72/23 |
| 2025/0081066 | A1* | 3/2025 | Khoshkholgh Dashtaki | H04W 36/249 |

OTHER PUBLICATIONS

Mediatek Inc., et al., "38.300 running CR for introduction of NR further mobility enhancements", 3GPP TSG-RAN WG2 Meeting #123bis, R2-2311610, Oct. 9-13, 2023, 34 Pages, Xiamen, China.

* cited by examiner

BEAM SELECTION DURING RANDOM ACCESS BASED ON PRE-SYNCHRONIZATION

RELATED APPLICATIONS

The present application is a continuation of International Application No. PCT/SE2025/050071, filed Jan. 31, 2025, which claims priority to U.S. Provisional Patent Application No. 63/550,361, filed Feb. 6, 2024, entitled "BEAM SELECTION DURING RANDOM ACCESS BASED ON PRE-SYNCRHONIZATION," the disclosures of which are hereby incorporated herein by reference in their entirety.

TECHNICAL FIELD

The present disclosure is related to wireless communication systems and more particularly to beam selection during random access ("RA") based on pre-synchronization.

BACKGROUND

FIG. 1 illustrates an example of a new radio ("NR") network (e.g., a 5th Generation ("5G") network) including a 5G core ("5GC") network 130, network nodes 120*a-b* (e.g., 5G base station ("gNB")), multiple communication devices 110 (also referred to as user equipment ("UE")).

Layer 1 ("L1")/Layer 2 ("L2")-Triggered Mobility ("LTM") can be defined as a Primary Cell ("PCell") (or primary secondary cell ("PSCell")) cell switch procedure, consequently with Cell Group change (e.g., Master Cell Group ("MCG") or Secondary Cell Group ("SCG") that the network triggers via media access control ("MAC") Control Element ("CE") based on L1 measurements. In that procedure, a gNodeB ("gNB") receives the L1 measurement report(s) from the UE, and on their basis the gNB changes UE's serving cell by a cell switch command signaled via a MAC CE. The cell switch command indicates an LTM candidate cell configuration that the gNB previously prepared and provided to the UE through RRC signaling. Then the UE switches to the target cell according to the cell switch command.

When configured by the network, it is possible to activate Transmission Configuration Indicator ("TCI") states of one or multiple cells that are different from the current serving cell, which may be called LTM candidate cells. For instance, the TCI states of the LTM candidate cells can be activated in advance before any of those cells become the serving cell (e.g., by reception of a MAC CE indicating an LTM candidate and a TCI state of the indicated LTM candidate). This allows the UE to be downlink ("DL") synchronized with those indicated cells, thereby facilitating a faster cell switch to one of those cells when cell switch is triggered.

While the UE has stored LTM candidate cell configurations the UE can also execute any Layer 3 ("L3") handover command sent by the network. It is up to the network to avoid any issue due to a collision between LTM execution and L3 handover execution (e.g., avoiding sending LTM cell switch command and L3 handover command simultaneously).

SUMMARY

According to some embodiments, a method of operating a communication device is provided. The method includes activating a transmission configuration indicator, TCI, state of a candidate cell. The method further includes, subsequent to activating the TCI state of the candidate cell, selecting a beam of the candidate cell as part of a random access, RA, procedure with the candidate cell. The method further includes selecting a preamble and a random access channel, RACH, resource based on the beam of the candidate cell. The method further includes transmitting the preamble to the RACH resource.

According to other embodiments, a communication device, a network node, a computer program, computer program product, non-transitory computer readable medium, host, or system is provided to perform one of the above methods.

Certain embodiments may provide one or more of the following technical advantages. In some embodiments, an advantage includes that when the UE needs to perform random access to a cell for which the UE already has an activated TCI state, the UE can reduce the mobility interruption time since by selecting in random access the beam for which associated TCI state is already activated the UE is ready to receive PDCCH transmitted on that spatial direction, i.e., there would be no need to select another beam and perform additional measurements or further synchronization procedures towards a beam for which the TCI state is not activated. Thanks to the method the UE would not need to perform fine time tracking and acquire full timing information of the LTM candidate cell during random access, since the UE selects an SSB for which the UE has previously received a TCI state activation indication.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
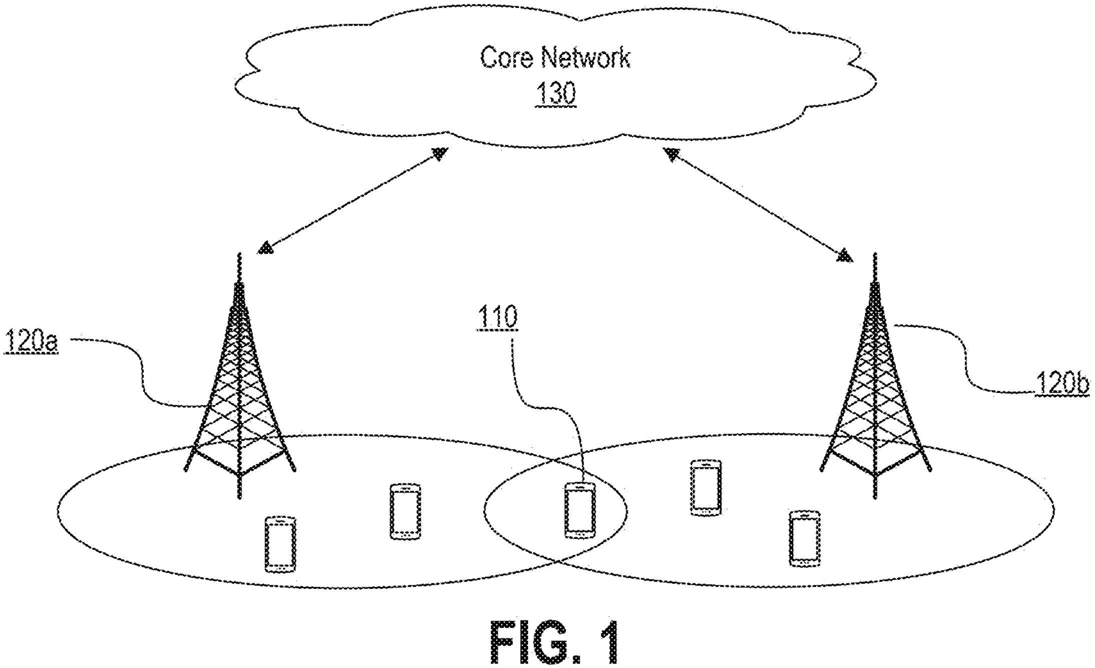
FIG. 1 is a schematic diagram illustrating an example of a 5th generation ("5G") network.
Figure 2:
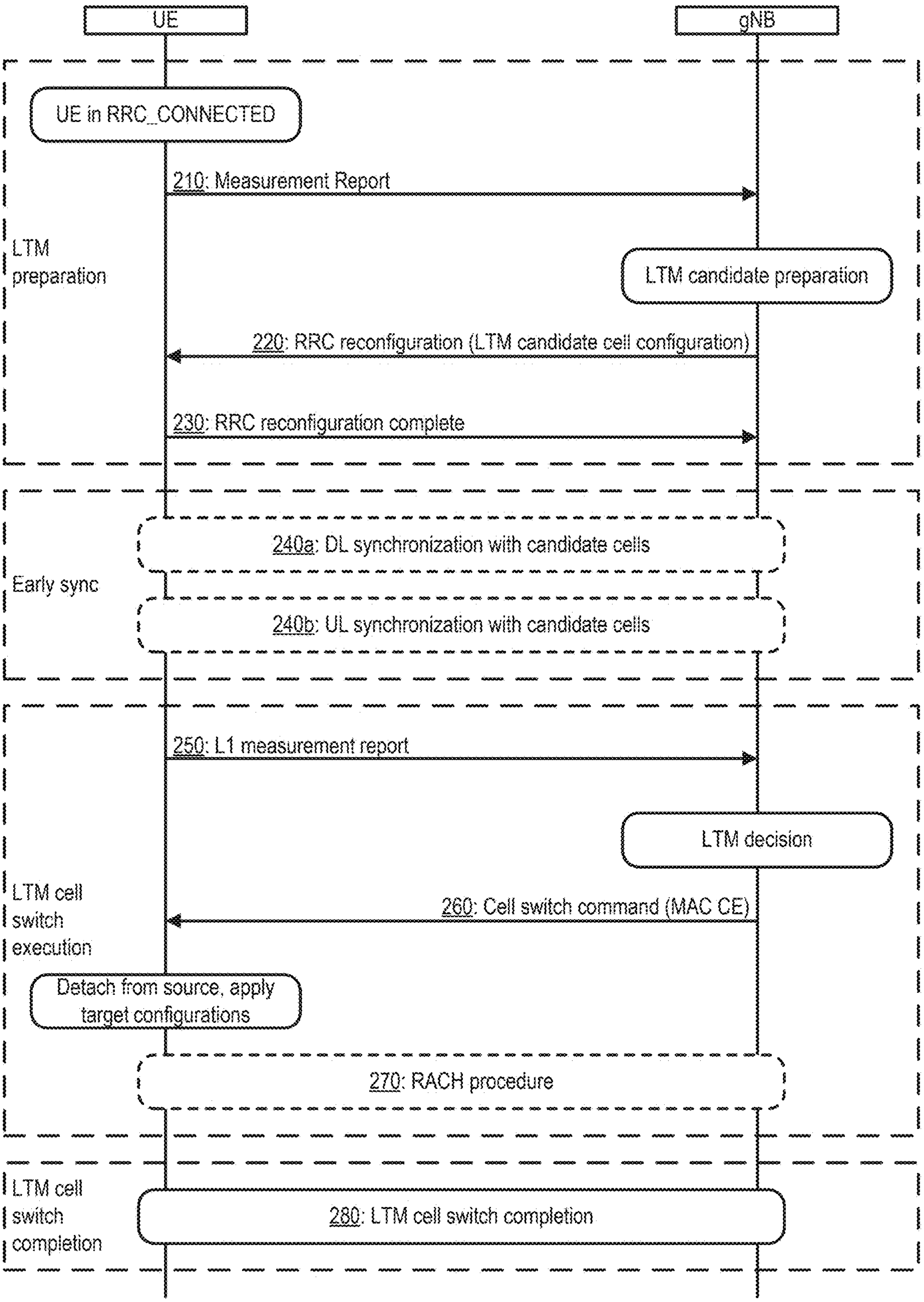
FIG. 2 is a signal flow diagram illustrating an example of a LTM procedure.

FIG. 2 illustrates an example of an overall procedure for LTM.

At block 210, the UE sends a MeasurementReport message to the gNB. The gNB decides to configure LTM and initiates candidate cell(s) preparation.

At block 220, the gNB transmits an RRCReconfiguration message to the UE including the LTM candidate cell configurations of one or multiple candidate cells.

At block 230, the UE stores the LTM candidate cell configurations and transmits an RRCReconfigurationComplete message to the gNB.

At block 240*a*, the UE performs DL synchronization with the candidate cell(s) before receiving the cell switch command.

At block 240*b*, the UE performs UL synchronization with the candidate cell(s) before receiving the cell switch command.

At block 250, the UE performs L1 measurements on the configured candidate cell(s) and transmits L1 measurement reports to the gNB. L1 measurement should be performed as long as RRC reconfiguration (at block 220) is applicable.

At block 260, the gNB decides to execute cell switch to a target cell and transmits a MAC CE triggering cell switch by including the candidate configuration index of the target cell. The UE switches to the target cell and applies the configuration indicated by candidate configuration index.

At block 270, the UE performs the random access procedure towards the target cell, if UE does not have valid Timing Advance ("TA") of the target cell. The UE performs Contention Free Random Access ("CFRA") if the LTM cell switch command MAC CE contains information for CFRA.

At block 280, the UE completes the LTM cell switch procedure by sending RRCReconfigurationComplete message to target cell. If the UE has performed a RA procedure (block 270) the UE considers that LTM cell switch execution is successfully completed when the random access procedure is successfully completed. For RACH-less LTM, the UE considers that LTM cell switch execution is successfully completed when the UE determines that the network has successfully received its first UL data. The UE determines successful reception of its first UL data by receiving a PDCCH addressing the UE's C-RNTI in the target cell, which schedules a new transmission following the first UL data. The PDCCH carries either a DL assignment or an UL grant addressing the same HARQ process as the first UL data.

When the UE receives an LTM cell switch command the UE may either trigger a RACH-less procedure or a Random Access procedure, which can either be Contention-Free Random Access ("CFRA") or Contention Based Random Access ("CBRA"). In some examples, the UE determines to perform CBRA or CFRA.

In the CBRA case, the UE performs a random-access procedure towards the candidate cell and, as part of that, the UE needs to select a preamble and a random access resource in time/frequency domain of a Random Access Channel ("RACH") for transmitting the random access preamble.

That process includes the UE selecting a "beam" and selecting a preamble and a time/frequency domain RACH resource based on a mapping between the selected beam and RACH resources. Such a mapping is provided as part of the RACH configuration which the UE can obtain by acquiring system information or via an RRC Reconfiguration message. Selecting the "beam" in this context, according to TS 38.321, includes the UE selecting a Synchronization Signal Block ("SSB") of the cell for which to trigger random access procedure (i.e. in which the UE transmits the preamble), with Reference Signal Received Power ("RSRP") above a threshold (which is also part of the RACH configuration of that cell). The requirement (that is specified) can be that the UE selects an SSB with SS-RSRP above the RSRP threshold (rsrp-ThresholdSSB). When there are multiple SSBs fulfilling that requirement, it is up to UE implementation as to which SSB to select.

There currently exist certain challenges. In some examples, a UE configured with LTM may be configured with one or more LTM candidate cells, and for at least one LTM candidate cell the UE may be configured with so-called candidate TCI state(s) (e.g., TCI state ID=x, TCI state ID=y, TCI state ID=2) which may be activated and/or deactivated upon further reception of a MAC CE. Thanks to this TCI activation of an LTM candidate cell, when the UE further receives the LTM cell switch command including a TCI State Id (e.g., TCI state ID=x) associated to indicated LTM candidate cell, the UE considers that indicated TCI state to be the one to be considered activated in the LTM candidate cell after the LTM cell switch, in the case of a RACH-less LTM cell switch.

However, despite the fact that the UE has performed pre-synchronization with an LTM candidate cell (i.e., has one or more TCI states activated for that LTM candidate cell), the UE may be triggered by the "LTM Cell Switch Command" MAC CE indicating that a Timing Advance value is not valid (by indicating a value "FFF" in the LTM Cell Switch Command). In this case, the UE may need to do a beam selection to identify when to perform the RACH procedure and this beam selection procedure would delay the LTM cell switch command, thus increasing the LTM cell switch delay and the data interruption time.

Certain aspects of this disclosure and the embodiments herein may provide solutions to these or other challenges. Various embodiments herein describe a procedure performed by a communication device (sometimes referred to as a user equipment ("UE")) in which the UE receives at least one indication to activate a TCI state of a candidate cell the UE is configured with and activates the indicated TCI state, while connected to a source cell; the UE further triggers a random access procedure to the candidate cell, and as part of that random access procedure, the UE selects a beam of the candidate cell, wherein the beam is associated with the activated TCI state, and based on the selected beam of the candidate cell the UE selects a preamble and a time/frequency domain Random Access Channel ("RACH") resource, and transmits the selected preamble to the selected time/frequency domain RACH resource.

In some embodiments, this procedure is applicable to LTM, in case LTM cell switch is triggered based on random access. However, that should not be a limiting example, and the invention is applicable in any context in which the UE is triggered to activate a TCI state of a cell (e.g., serving cell or neighbor cell) and further triggers a random access procedure to that cell, in which the UE needs to select a beam of that cell as part of the UE implementation.

In additional or alternative embodiments, the procedure is applicable to any mobility procedure (e.g., CHO, L3 mobility) in which the activates a TCI state of a neighbor cell (or candidate cell the UE is configured with) and further trigger random access to that cell e.g., when it receives a mobility command, and/or when it applies a mobility command upon fulfillment of an execution condition, or when a re-establishment procedure is initiated and the UE selects that candidate cell or neighbor cell, or when the UE In additional or alternative embodiments, the procedure is applicable to procedures related to serving cell(s), in which the UE activates a TCI state of a serving cell (e.g., PCell or SCell of a cell group) and further trigger random access to that serving cell, for example, upon Beam Failure Detection leading to Beam Failure Recovery triggering random access (in that case, the UE selects during random access, among the candidate beams configured for BFR, the beam associated to the activated TCI state of the serving cell for which the UE is performing BFR).

In additional or alternative embodiments, the procedure is also applicable to procedures related to the initiation of an RRC re-establishment due to a radio link failure by the UE. This is the case when the UE experiences RLF, select a new cell on which to perform the RACH procedure to initiate the RRC re-establishment, and the selected cell is a cell on which one or more TCI state have been previously updated.

Various embodiments herein refer to the UE selecting a beam. In general terms, selecting a beam may correspond to selecting a Reference Signal ("RS") and/or Synchronization Signal ("SS"), such as a Synchronization Signal Block ("SSB") or Channel State Information-RS ("CSI-RS"), or Mobility Reference Signal ("MRS"). In that context, a beam may be interpreted as a spatial direction (of filter) which the RS or SS is being transmitted.

In some embodiments, the UE selects a beam, wherein the beam is associated to an activated TCI state. The beam being associated with the activated TCI state corresponds to an RS (or SS) transmitted in the beam, for example, indicated by an SSB index and/or CSI-RS resource identifier, being configured as Quasi-Co-Location ("QCL") source of the activated TCI state of the candidate cell.

In some embodiments, a procedure at a User Equipment ("UE") can be performed in which the UE receives at least one indication to activate a TCI state of a candidate cell the UE is configured with and activates the indicated TCI state, while connected to a source cell; the UE further triggers a random access procedure to the candidate cell, and as part of that random access procedure, the UE selects a beam of the candidate cell, wherein the beam is associated with the activated TCI state, and based on the selected beam of the candidate cell the UE selects a preamble and a time/frequency domain RACH resource, and transmits the selected preamble to the selected time/frequency domain RACH resource.

In additional or alternative embodiments, the UE selects an SSB of the candidate cell with a measurement of the SSB, such as a Reference Signal Received Power ("RSRP"), being above a configured threshold (e.g., rsrp-Threshold-SSB). In other words, the UE may have received multiple MAC CEs for activating multiple TCI states, i.e., there are multiple associated SSBs the UE could select, so that the UE selects the SSB among the SSB(s) associated to activated TCI states and with an associated RSRP above the threshold.

In additional or alternative embodiments, the UE selects an SSB of the candidate cell with the strongest measurement of the SSB (e.g., strongest RSRP and/or strongest SINR and/or strongest RSRQ), among the SSBs associated to activated TCI state(s) of the candidate cell. In other words, the UE may have received multiple MAC CEs for activating multiple TCI states, i.e., there are multiple associated SSBs the UE could select, so that the UE selects the SSB among the SSB(s) associated to activated TCI states and with the strongest RSRP.

In additional or alternative embodiments, the UE is triggered to perform a first random access procedure on the candidate cell (e.g., UE received a PDCCH order indicating an SSB X), for example, for TA establishment. Later, the UE further triggers a second random access procedure to the same candidate cell, when there are multiple TCI states activated on the candidate cell, the UE selects the SSB of the candidate cell on which previous random access procedure was triggered provided the SSB measurement (e.g., RSRP of SSB X) is above certain threshold and that the SSB is among the SSBs associated to the activated TCI state(s). Selecting the SSB X (e.g., instead of the SSB Y with strongest RSRP) is advantageous in the following ways.

In some examples, a UE may have RACH transmission parameters (e.g., like previously selected UL TX filter information, power used for the transmission, etc.) stored and UE can reuse the same parameters which may increase the chance of RACH success in the first attempt.

In additional or alternative examples, saving small computation resources (determining SSB Y involves comparison of the SSB RSRP for different SSB and selecting suitable SSB X and determining RACH transmission parameters such as power of the RACH transmission, UL TX filter, etc., if UE selects SSB other than SSB X).

Figure 3:
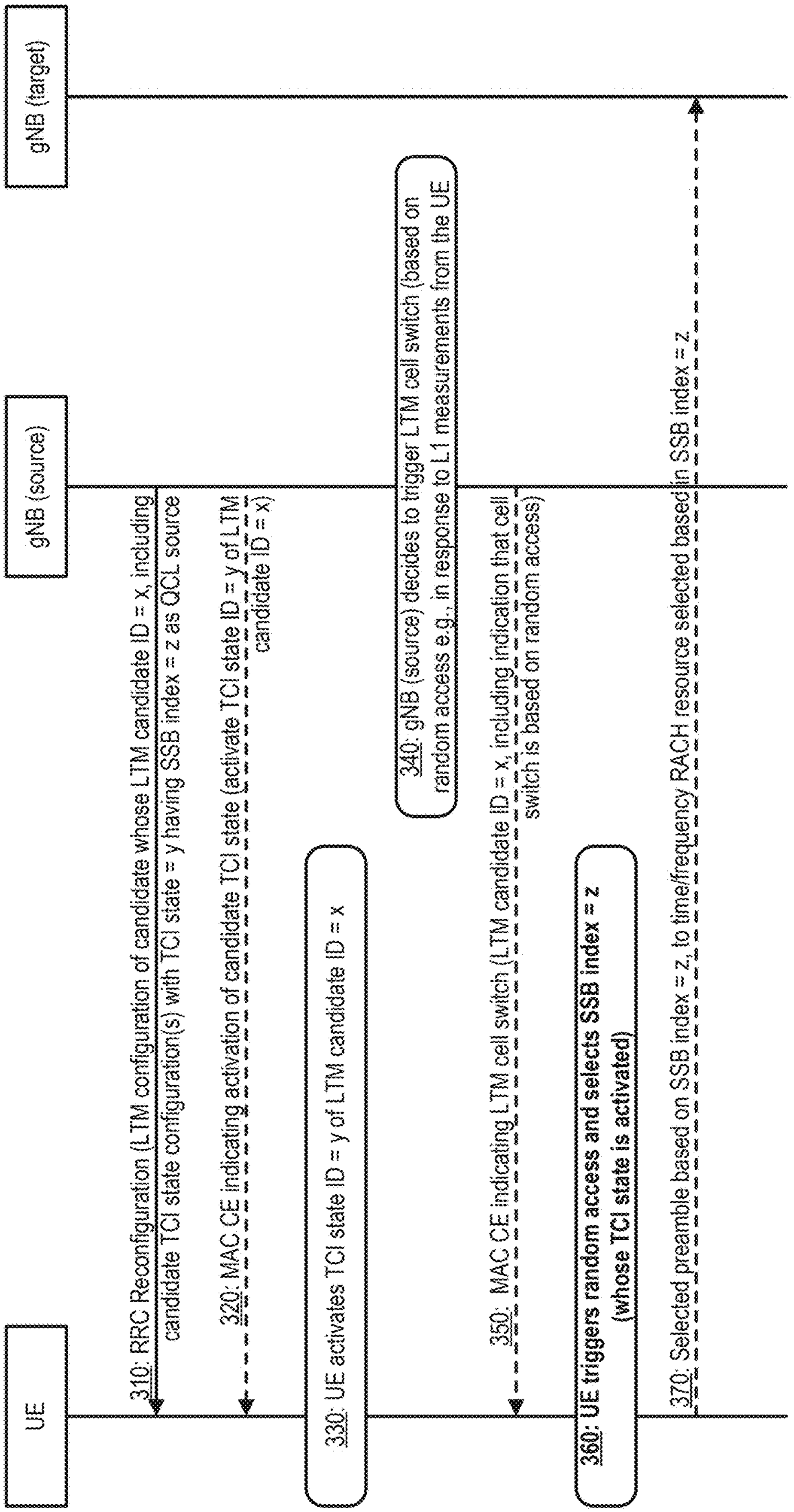
FIG. 3 is a signal flow diagram illustrating an example of an implementation for LTM in accordance with some embodiments.

FIG. 3 illustrates an example of an implementation for LTM. At block 310, a gNB (providing a source cell to a UE) transmits a RRC reconfiguration to the UE. At block 320, the gNB transmits a MAC CE indicating activation of a candidate TCI state. At block 330, the UE activates the TCI state. At block 340, the gNB decides to trigger LTM cell switch. At block 350, the gNB transmitting a MAC CE indicating the LTM cell switch to the UE. At block 360, the UE triggers a random access procedure and selects the beam (SSB index=2). At block 370, the UE transmits a selected preamble based on the beam to a gNB configured to provide a target cell.

In some embodiments, related to the implementation for LTM, the UE receives a MAC CE (e.g., "Candidate Cell TCI States Activation/Deactivation MAC CE") indicating the activation of a TCI state (e.g., by including a TCI state ID=y) of an LTM candidate cell the UE is configured with (e.g., LTM candidate cell whose LTM candidate ID=x) and activates the indicated TCI state, while connected to a source cell; the UE further triggers a random access procedure to the LTM candidate cell (e.g., LTM candidate cell whose LTM candidate ID=x), and as part of that random access procedure, the UE selects an SSB of the LTM candidate cell, wherein the SSB of the LTM candidate cell is the SSB configured as QCL source of the activated TCI state, and based on the selected SSB of the LTM candidate cell the UE selects a preamble and a time/frequency domain Random Access Channel (RACH) resource, and transmits the selected preamble to the selected time/frequency domain RACH resource.

SSB here is used as an example SS or RS, but the method is applicable to any RS which the UE needs to select as part of its implementation (e.g., CSI-RS, or MRS).

In additional or alternative embodiments, the UE selects an SSB of the LTM candidate cell with a measurement of the SSB, such as a RSRP, being above a configured threshold (e.g., rsrp-ThresholdSSB). In other words, the UE may have received multiple MAC CEs for activating multiple TCI states, i.e., there are multiple associated SSBs the UE could select, so that the UE selects the SSB among the SSB(s) associated to activated TCI states and with an associated RSRP above the threshold.

In additional or alternative embodiments, the UE selects an SSB of the LTM candidate cell with the strongest measurement of the SSB (e.g., strongest RSRP and/or strongest SINR and/or strongest RSRQ), among the SSBs associated to activated TCI state(s) of the LTM candidate cell. In other words, the UE may have received multiple MAC CEs for activating multiple TCI states, i.e., there are multiple associated SSBs the UE could select, so that the UE selects the SSB among the SSB(s) associated to activated TCI states and with the strongest RSRP.

In additional or alternative embodiments, the UE triggers random access in response to the reception of an LTM Cell Switch Command (e.g., MAC CE), including an indication that the UE needs to perform the LTM cell switch with a random access procedure to the LTM candidate cell indicated in the LTM Cell Switch Command.

In some examples, the UE is indicated to perform random access by the reception in the LTM cell switch command of an indication that a Timing Advance ("TA") value is not valid for the indicated LTM candidate cell i.e. random access is needed. That indication may be a value 'FFF' for the TA value field in the LTM cell switch command.

In additional or alternative examples, the UE is further indicated to perform a specific type of random access, such as a Contention Based Random Access ("CBRA"), based on which the UE selects the SSB associated to the activated TCI state. The UE can be indicated to perform CBRA, for example, when the LTM cell Switch Command does not include information associated to Contention-Free Random Access (e.g., the 'C' field in the LTM Cell Switch MAC CE which indicates the presence of the CFRA resources is set to 0, so that Random Access Preamble index field, SS/PBCH index field and PRACH Mask index field are absent).

In additional or alternative examples, the UE is further indicated to perform a specific type of random access, such as a CFRA. When CFRA is indicated, the UE selects the indicated SSB, preamble and RACH resource(s), however, when the first attempt fails, i.e., when the UE does not receive a Random Access Response ("RAR") from the LTM candidate cell within the configured RAR time window, may need to UE select an SSB for performing CBRA and selects the SSB associated to the activated TCI state of the LTM candidate cell. The UE can indicated to perform CFRA, for example, when the LTM cell Switch Command includes information associated to CFRA e.g., the 'C' field in the LTM Cell Switch MAC CE which indicates the presence of the CFRA resources is set to 1, so that the LTM Cell Switch further includes Random Access Preamble index field, SS/PBCH index field and PRACH Mask index field).

In additional or alternative examples, the UE is indicated to estimate the TA itself via the UE-based TA acquisition procedure. However, if the UE is not able to estimate the TA value on its own, the UE may need to select an SSB for performing CBRA and selects the SSB associated to the activated TCI state of the LTM candidate cell.

In additional or alternative embodiments, the UE triggers random access in response to the reception of a handover ("HO") command (e.g., RRC Reconfiguration including an indication of a Reconfiguration With Sync) indicating a target cell which is already configured at the UE as an LTM candidate cell, and for which the UE has received a command to activate a TCI state of that cell. In response to the HO command, random access is triggered (e.g., for the UE to obtain an Uplink grant for transmitting an RRC Reconfiguration Complete message) and as part of that the UE selects a beam (e.g., an SSB) associated to the activated TCI state.

In some examples, the UE triggers a CBRA to the target cell configured at the UE as an LTM candidate cell. The UE triggers a CBRA procedure to the target, for example, when there is no CFRA configuration included in the HO command.

In additional or alternative examples, the UE triggers a CFRA to the target cell configured at the UE as an LTM candidate cell. The UE triggers a CFRA procedure to the target, for example, when there is a CFRA configuration included in the HO command.

In additional or alternative examples, there are multiple CFRA resources associated to SSBs of the target cell, and the UE selects an SSB associated to an activated TCI state for selecting the preamble and time/frequency RACH resources in the among the CFRA resource(s) in the CFRA configuration.

In additional or alternative examples, the UE triggers a CFRA to the target cell configured at the UE as an LTM candidate cell, however, after one or more failed random access attempts the UE performs CBRA, and it is in the CBRA procedure which the UE selects an SSB associated to an activated TCI state.

In additional or alternative embodiments, the UE triggers random access in response to the initiation of an RRC Re-establishment procedure (e.g., due to a Radio Link Failure (RLF) or Reconfiguration with Sync Failure or Random access failure) to a cell which is an LTM candidate cell the UE is configured with and that the UE has received a MAC CE activating at least one of its TCI states. In response to the initiating of the RRC Re-establishment procedure, random access is triggered to the LTM candidate cell and as part of that the UE selects a beam (e.g., an SSB) associated to the activated TCI state.

In some examples, the initiation of the re-establishment procedure to the LTM candidate cell leads to an LTM Cell Switch procedure (when fast recovery is configured), wherein the LTM cell switch is based on CBRA, which comprises the UE selecting the SSB associated to the activated TCI state of the LTM candidate cell.

In additional or alternative examples, the initiation of the re-establishment procedure to the LTM candidate cell leads to the continuation of a re-establishment procedure (when fast recovery is not configured), so that before the transmission of an RRC Reestablishment Request message the UE triggers the CBRA, which comprises the UE selecting the SSB associated to the activated TCI state of the LTM candidate cell selected by the UE while timer T311 was running.

In additional or alternative examples, the initiation of the re-establishment procedure least to an LTM cell switch procedure towards an LTM candidate cell where the UE is indicated to estimate the TA itself via the UE-based TA acquisition procedure. However, if the UE is not able to estimate the TA value on its own, the UE may need to select an SSB for performing CBRA and selects the SSB associated to the activated TCI state of the LTM candidate cell.

In additional or alternative embodiments, the UE triggers random access in response to the fulfillment of an execution condition for a Conditional LTM (to be specified in Rel-19). When one of the LTM candidate cell(s) for which a TCI state is activated fulfills the execution condition, the UE performs an LTM cell switch based on a CBRA and, as part of that the UE selects a beam (e.g., an SSB) associated to the activated TCI state of the cell fulfilling the execution condition(s).

Figure 4:
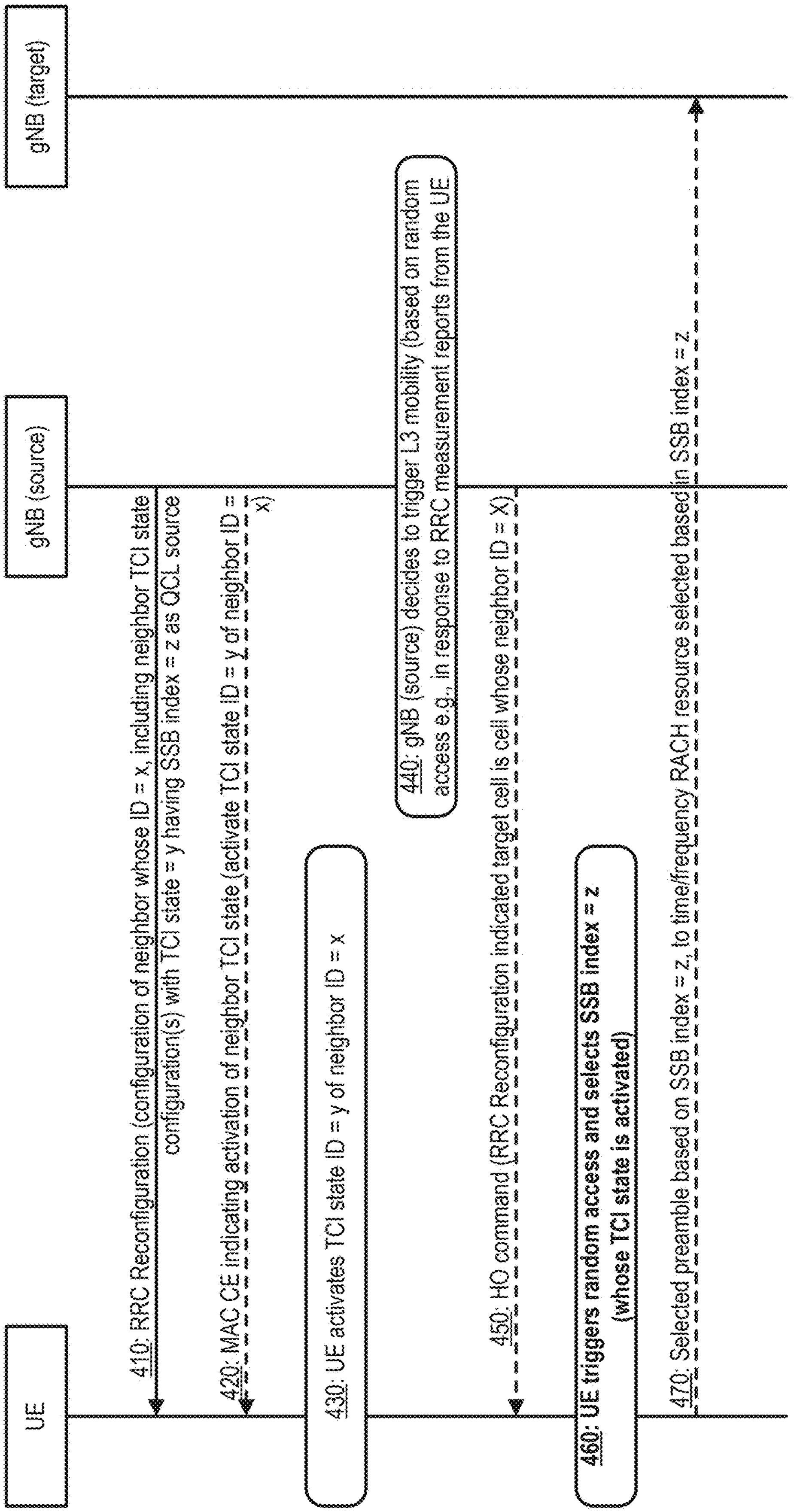
FIG. 4 is a signal flow diagram illustrating an example of an implementation for L3 mobility in accordance with some embodiments.

FIG. 4 illustrates an example of an implementation for L3 mobility. At block 410, a gNB (providing a source cell to a UE) transmits a RRC reconfiguration to the UE. At block 420, the gNB transmits a MAC CE indicating activation of a candidate TCI state. At block 430, the UE activates the TCI state. At block 440, the gNB decides to trigger L3 mobility. At block 450, the gNB transmitting a HO command. At block 460, the UE triggers a random access procedure and selects the beam (SSB index=z). At block 470, the UE transmits a selected preamble based on the beam to a gNB configured to provide a target cell.

In some embodiments, related to the implementation for L3 mobility, the UE receives a MAC CE (e.g., "Candidate Cell TCI States Activation/Deactivation MAC CE") indicating the activation of a TCI state (e.g., by including a TCI state ID=y) of a neighbor cell the UE is configured with (e.g., neighbor cell associated to a neighbor ID=x) and activates the indicated TCI state, while connected to a source cell; the UE further triggers a random access procedure to the neighbor cell (e.g., neighbor cell whose neighbor ID=x), and as part of that random access procedure, the UE selects an SSB of the neighbor cell, wherein the SSB of the neighbor cell is the SSB configured as QCL source of the activated TCI state, and based on the selected SSB of the neighbor cell the UE selects a preamble and a time/frequency domain RACH resource, and transmits the selected preamble to the selected time/frequency domain RACH resource.

SSB here is used as an example SS or RS, but the method is applicable to any RS which the UE needs to select as part of its implementation (e.g., CSI-RS, or MRS).

In additional or alternative embodiments, the UE triggers random access in response to the reception of a HO command (e.g., RRC Reconfiguration including an indication of a Reconfiguration With Sync) indicating a target cell which is already configured at the UE as a neighbor cell for which the UE has received a command to activate a TCI state of that cell. In response to the HO command, random access is triggered (e.g., for the UE to obtain an Uplink grant for transmitting an RRC Reconfiguration Complete message) and as part of that the UE selects a beam (e.g., an SSB) associated to the activated TCI state.

In some examples, the UE triggers a CBRA to the target cell configured at the UE as an LTM candidate cell. The UE triggers a CBRA procedure to the target, for example, when there is no CFRA configuration included in the HO command.

In additional or alternative examples, the UE triggers a CFRA to the target cell configured at the UE as an LTM candidate cell. The UE triggers a CFRA procedure to the target, for example, when there is a CFRA configuration included in the HO command.

In additional or alternative examples, there are multiple CFRA resources associated to SSBs of the target cell, and the UE selects an SSB associated to an activated TCI state for selecting the preamble and time/frequency RACH resources in the among the CFRA resource(s) in the CFRA configuration.

In additional or alternative examples, the UE triggers a CFRA to the target cell configured at the UE as an LTM candidate cell, however, after one or more failed random access attempts the UE performs CBRA, and it is in the CBRA procedure which the UE selects an SSB associated to an activated TCI state.

In additional or alternative examples, the UE is indicated to estimate the TA itself via the UE-based TA acquisition procedure. However, when the UE is not able to estimate the TA value on its own, the UE selects an SSB for performing CBRA and selects the SSB associated to the activated TCI state of the LTM candidate cell.

In additional or alternative embodiments, the UE triggers random access in response to the initiation of an RRC Re-establishment procedure (e.g., due to a Radio Link Failure (RLF) or Reconfiguration with Sync Failure or Random access failure) to a cell which is a neighbor cell for which the UE has received a MAC CE activating at least one of its TCI states. In response to the initiating of the RRC Re-establishment procedure, random access is triggered to the neighbor cell and as part of that the UE selects a beam (e.g., an SSB) associated to the activated TCI state. The initiation of the re-establishment procedure to the LTM candidate cell leads to the continuation of a re-establishment procedure (when fast recovery is not configured), so that before the transmission of an RRC Reestablishment Request message the UE triggers the CBRA, which comprises the UE selecting the SSB associated to the activated TCI state of the LTM candidate cell selected by the UE while timer T311 was running.

Figure 5:
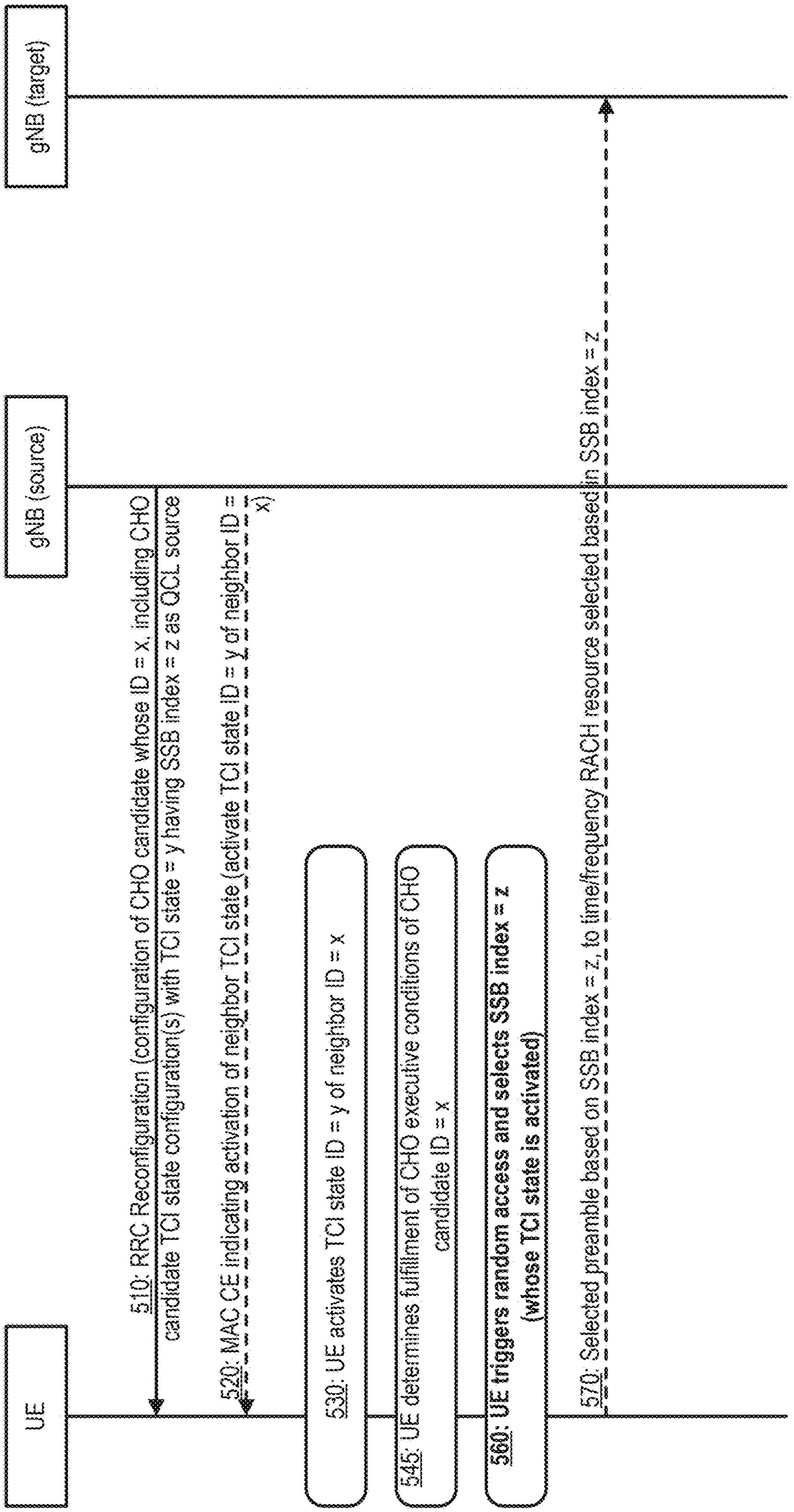
FIG. 5 is a signal flow diagram illustrating an example of an implementation for CHO in accordance with some embodiments.

FIG. 5 illustrates an example of an implementation for CHO. At block 510, a gNB (providing a source cell to a UE) transmits a RRC reconfiguration to the UE. At block 520, the gNB transmits a MAC CE indicating activation of a neighbor TCI state. At block 530, the UE activates the TCI state. At block 545, the gNB determines fulfillment of CHO execution conditions of the CHO. At block 560, the UE triggers a random access procedure and selects the beam (SSB index=z). At block 570, the UE transmits a selected preamble based on the beam to a gNB configured to provide a target cell.

In additional or alternative embodiments, the UE triggers random access in response to the fulfillment of an execution condition for a Conditional LTM (to be specified in Rel-19). When one of the LTM candidate cell(s) for which a TCI state is activated fulfills the execution condition, the UE performs an LTM cell switch based on a CBRA and, as part of that the UE selects a beam (e.g., an SSB) associated to the activated TCI state of the cell fulfilling the execution condition(s).

In some embodiments, related to the implementation for Conditional Handover (CHO), the UE receives a MAC CE (e.g., "Candidate Cell TCI States Activation/Deactivation MAC CE") indicating the activation of a TCI state (e.g., by including a TCI state ID=y) of a CHO candidate cell the UE is configured with (e.g., CHO candidate cell associated to a CHO Candidate ID=x) and activates the indicated TCI state, while connected to a source cell; the UE further triggers a random access procedure to the CHO Candidate cell (e.g., CHO Candidate cell whose CHO Candidate Cell ID=x), and as part of that random access procedure, the UE selects an SSB of the neighbour cell, wherein the SSB of the neighbour cell is the SSB configured as QCL source of the activated TCI state, and based on the selected SSB of the CHO Candidate cell the UE selects a preamble and a time/ frequency domain Random Access Channel (RACH) resource, and transmits the selected preamble to the selected time/frequency domain RACH resource.

SSB here is used as an example SS or RS, but the method is applicable to any RS which the UE needs to select as part of its implementation (e.g., CSI-RS, or MRS).

In additional or alternative embodiments, the UE triggers random access in response to applying a HO command (e.g., RRC Reconfiguration including an indication of a Reconfiguration With Sync) indicating a CHO candidate cell for which the UE has received a command to activate a TCI state of that cell, wherein the UE applies the HO command in response to the fulfillment of a CHO execution condition (e.g., associated to A3 event). In response to the HO command being applied, random access is triggered (e.g., for the UE to obtain an Uplink grant for transmitting an RRC Reconfiguration Complete message) and as part of that the UE selects a beam (e.g., an SSB) associated to the activated TCI state.

In additional or alternative embodiments, the UE triggers random access in response to the initiation of an RRC Re-establishment procedure (e.g., due to a Radio Link Failure ("RLF") or Reconfiguration with Sync Failure or Random access failure) to a cell which is a CHO candidate cell the UE is configured with and that the UE has received a MAC CE activating at least one of its TCI states. In response to the initiating of the RRC Re-establishment procedure, random access is triggered to the CHO candidate cell and as part of that the UE selects a beam (e.g., an SSB) associated to the activated TCI state.

In some examples, the initiation of the re-establishment procedure to the CHO candidate cell leads to a CHO execution procedure (when CHO fast recovery is configured), wherein the CHO execution is based on CBRA, which comprises the UE selecting the SSB associated to the activated TCI state of the CHO candidate cell.

In additional or alternative examples, the initiation of the re-establishment procedure to the CHO candidate cell leads to the continuation of a re-establishment procedure (when CHO fast recovery is not configured), so that before the transmission of an RRC Reestablishment Request message the UE triggers the CBRA, which comprises the UE selecting the SSB associated to the activated TCI state of the CHO candidate cell selected by the UE while timer T311 was running.

In additional or alternative examples, the initiation of the re-establishment procedure least to a CHO execution procedure towards a CHO candidate cell where the UE is indicated to estimate the TA itself via the UE-based TA acquisition procedure. However, if the UE is not able to estimate the TA value on its own, the UE may need to select an SSB for performing CBRA and selects the SSB associated to the activated TCI state of the CHO candidate cell.

Embodiments related to the implementation for BFR on serving cell are described below.

Some embodiments are applicable to procedures related to serving cell(s), in which the UE activates a TCI state of a serving cell (e.g., PCell or SCell of a cell group) and further trigger random access to that serving cell, for example, upon Beam Failure Detection leading to Beam Failure Recovery triggering random access (in that case, the UE selects during random access, among the candidate beams configured for BFR, the beam associated to the activated TCI state of the serving cell for which the UE is performing BFR).

In some embodiments, related to the implementation for LTM, the UE receives a MAC CE (e.g., "Candidate Cell TCI States Activation/Deactivation MAC CE") indicating the activation of a TCI state (e.g., by including a TCI state ID=y) of a serving cell the UE is configured with (e.g., SCell whose SCell ID=x, or PCell, or PSCell) and activates the indicated TCI state, while connected to a source cell; the UE further triggers a random access procedure to the serving cell (e.g., serving cell with ID=x), due to a Beam Failure Detection which has triggered a Beam Failure Recovery leading to a random access procedure; and as part of that random access procedure, triggered by BFR, the UE selects an SSB of the serving cell among the SSBs configured as candidate SSBs for BFR, wherein the SSB of the serving cell is the SSB configured as QCL source of the activated TCI state, and based on the selected SSB of the serving cell the UE selects a preamble and a time/frequency domain RACH resource, and transmits the selected preamble to the selected time/frequency domain RACH resource.

In additional or alternative embodiments, while connected to a source cell, a UE can receive at least one indication to activate a TCI state of a candidate cell that the UE is configured with. In additional or alternative embodiments, the UE activates the indicated TCI state in response to the indication. In additional or alternative embodiments, in response to further triggering the UE can perform a random access procedure to the candidate cell, and as part of that random access procedure, select a beam of the candidate cell. In some examples, the beam is associated with the activated TCI state (or the RS is part of the QCL chain of the activated TCI state). In additional or alternative embodiments, based on the selected beam or selected RS of the candidate cell, the UE selects a preamble and a time/frequency domain RACH resource, and transmits the selected preamble to the selected time/frequency domain RACH resource.

In additional or alternative embodiments, selecting a beam includes selecting a RS and/or SS, such as a SSB or CSI-RS, or MRS.

In additional or alternative embodiments, the beam associated with the activated TCI state is associated to an RS (or SS) configured as QCL source of the activated TCI state of the candidate cell.

In additional or alternative embodiments, the candidate cell corresponds to an LTM candidate cell the UE is configured with.

In additional or alternative embodiments, selecting a beam or RS includes selecting a beam among beam(s) or RSs of the candidate cell whose a measurement (e.g., RSRP) is above a configured threshold.

In additional or alternative embodiments, selecting a beam or RS includes selecting a beam or RS among beam(s) or RSs of the candidate cell associated to activated TCI states. A further selection may occur based on a measurement (e.g., RSRP) which is above a configured threshold (e.g., select the beam with strongest RSRP among the beams whose TCI state is activated).

In additional or alternative embodiments, selecting the beam on which previous random access procedure was triggered by a network node, when the beam measurement is above certain threshold and the beam was associated to activated TCI state list.

In additional or alternative embodiments, the triggering of the random access procedure is in response to one or more of: Receiving an LTM cell switch command; Receiving a handover command (e.g., RRC Reconfiguration); Applying a handover command in response to the fulfillment of a CHO execution condition; Applying a handover command in response to the fulfillment of a LTM execution condition; and Initiation of a re-establishment procedure.

In additional or alternative embodiments, selecting of the beam or RS occurs in the first attempt for preamble transmission i.e. the first selecting of a beam or RS upon the triggering of the RA procedure.

In additional or alternative embodiments, selecting of the beam or RS occurs in an n-th attempt for preamble transmission, wherein the (n−1)-th attempt was unsuccessful.

Operations of the communication device 800 (implemented using the structure of FIG. 8) will now be discussed with reference to the flow chart of FIG. 6 according to some embodiments of inventive concepts. For example, modules may be stored in memory 810 of FIG. 8, and these modules may provide instructions so that when the instructions of a module are executed by respective communication device processing circuitry 802, communication device 800 performs respective operations of the flow chart.

Figure 6:
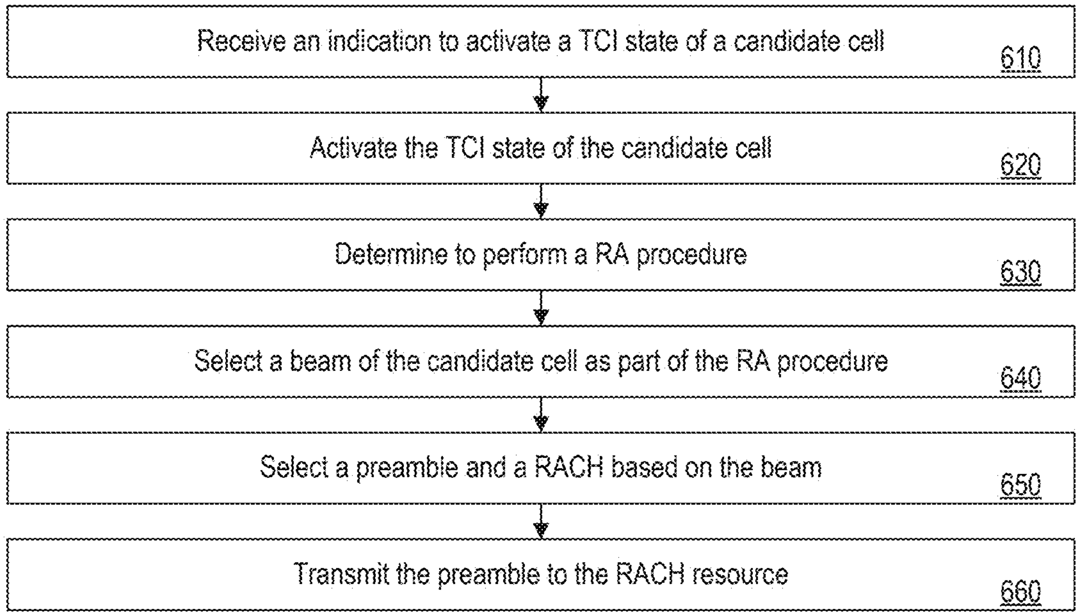
FIG. 6 is a flow chart illustrating an example of operations performed by a communication device in accordance with some embodiments.

FIG. 6 illustrates an example of operations performed by a communication device.

At block 610, processing circuitry 802 receives, via communication interface 812, an indication to activate a TCI state of a candidate cell. In some embodiments, the candidate cell comprises a Layer 1/Layer 2 triggered mobility, LTM, candidate cell.

At block 620, processing circuitry 802 activates the TCI state of the candidate cell. In some embodiments, activating the TCI state of the candidate cell includes activating the TCI state of the candidate cell while connected to a source cell that is separate from the candidate cell.

At block 630, processing circuitry 802 determines to perform a RA procedure. In some embodiments, determining to perform the RA procedure includes determining to perform the RA procedure based on at least one of: receiving a Layer 1/Layer 2 triggered mobility, LTM, cell switch command; receiving a handover command; applying a handover command in response to fulfillment of a conditional handover execution condition; applying a handover command in response to fulfillment of a LTM execution condition; and initiation of a re-establishment procedure.

At block 640, processing circuitry 802 selects a beam of the candidate cell as part of the RA procedure. In some embodiments, selecting the beam includes selecting at least one of: a reference signal, RS; a synchronization signal, SS; a synchronization signal block, SSB; a channel state information RS, CSI-RS; and a mobility RS, MRS.

In additional or alternative embodiments, selecting the beam of the candidate cell includes selecting a beam that is associated with the TCI state and that is configured as a quasi-co-location, QCL, source of the TCI state.

In additional or alternative embodiments, selecting the beam of the candidate cell includes selecting the beam from a plurality of beams of the candidate cell based on a measurement associated with the beam.

In additional or alternative embodiments, selecting the beam of the candidate cell includes selecting the beam from a plurality of beams of the candidate cell based on the beam being associated with an active TCI state.

In additional or alternative embodiments, selecting the beam of the candidate cell includes selecting the beam from a plurality of beams of the candidate cell based on the beam being used for a previous RA procedure.

In additional or alternative embodiments, selecting the beam of the candidate cell includes selecting the beam in response to a predetermined number of failed preamble transmission attempts of the RA procedure.

At block 650, processing circuitry 802 selects a preamble and a RACH based on the beam.

At block 660, processing circuitry 802 transmits, via communication interface 812, the preamble to the RACH resource. In some embodiments, selecting the beam of the candidate cell includes selecting the beam prior to a first preamble transmission attempt of the RA procedure. Transmitting the preamble to the RACH resource includes transmitting the first preamble transmission attempt using the beam.

Various operations from the flow chart of FIG. 6 may be optional with respect to some embodiments of communication devices and related methods.

Figure 7:
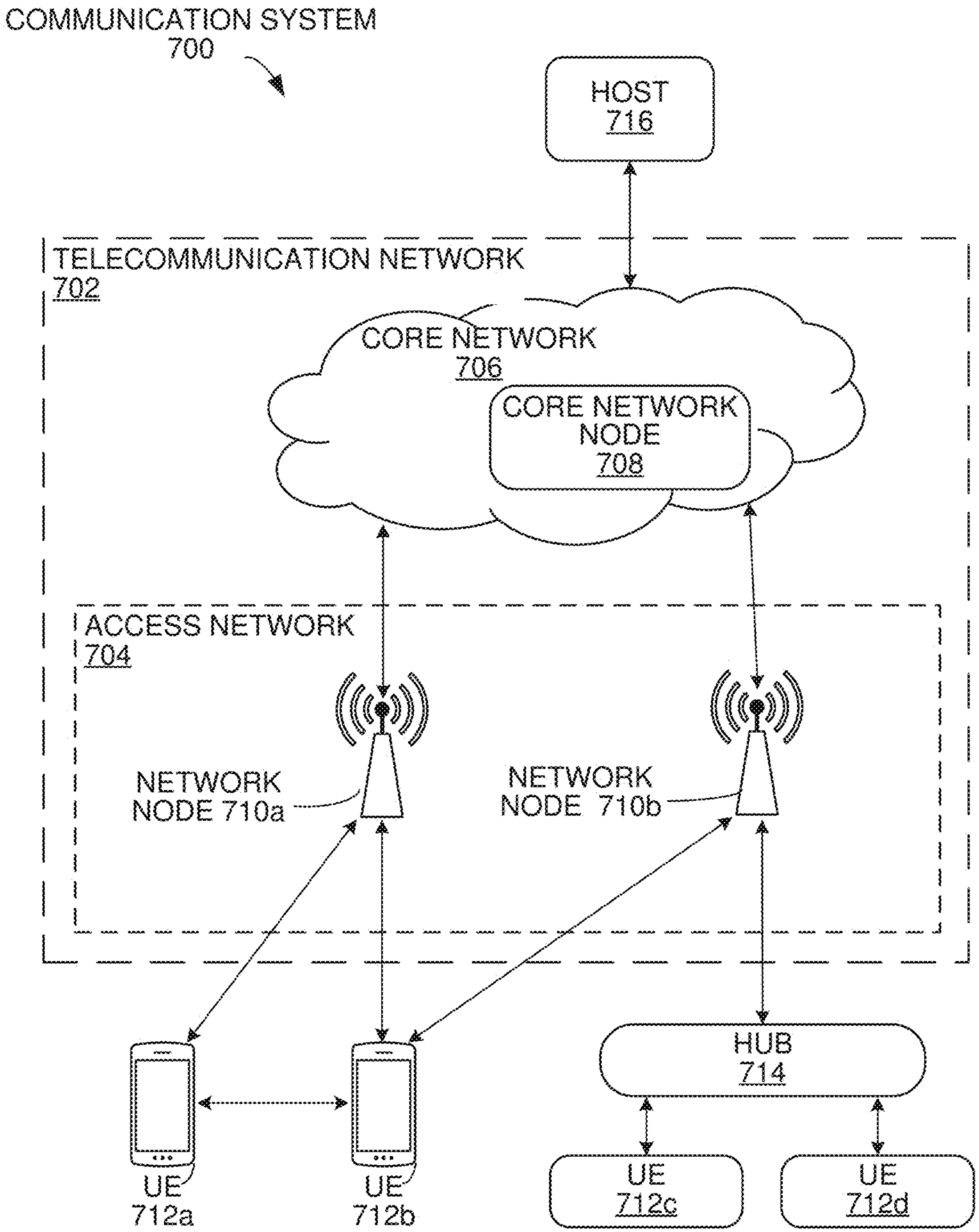
FIG. 7 is a block diagram of a communication system in accordance with some embodiments.

FIG. 7 shows an example of a communication system 700 in accordance with some embodiments.

In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710*a* and 710*b* (one or more of which may be generally referred to as network nodes 710), or any other similar 3rd Generation Partnership Project (3GPP) access node or non-3GPP access point. Moreover, as will be appreciated by those of skill in the art, the network nodes 710 are not necessarily limited to an implementation in which a radio portion and a baseband portion are supplied and integrated by a single vendor. Thus, it will be understood that the network nodes 710 may include disaggregated implementations or portions thereof. For example, in some embodiments, the telecommunication network 702 includes one or more Open-RAN (ORAN) network nodes. An ORAN network node is a node in the telecommunication network 702 that supports an ORAN specification (e.g., a specification published by the O-RAN Alliance, or any similar organization) and may operate alone or together with other nodes to implement one or more functionalities of any node in the telecommunication network 702, including one or more network nodes 710 and/or core network nodes 708.

Examples of an ORAN network node include an open radio unit (O-RU), an open distributed unit (O-DU), an open central unit (O-CU), including an O-CU control plane (O-CU-CP) or an O-CU user plane (O-CU-UP), a RAN intelligent controller (near-real time or non-real time) hosting software or software plug-ins, such as a near-real time RAN control application (e.g., xApp) or a non-real time RAN automation application (e.g., rApp), or any combination thereof (the adjective "open" designating support of an ORAN specification). The network node may support a specification by, for example, supporting an interface defined by the ORAN specification, such as an A1, F1, W1, E1, E2, X2, Xn interface, an open fronthaul user plane interface, or an open fronthaul management plane interface. Intents and content-aware notifications described herein may be communicated from a 3GPP network node or an ORAN network node over 3GPP-defined interfaces (e.g., N2, N3) and/or ORAN Alliance-defined interfaces (e.g., A1, O1). Moreover, an ORAN network node may be a logical node in a physical node. Furthermore, an ORAN network node may be implemented in a virtualization environment (described further below) in which one or more network functions are virtualized. For example, the virtualization environment may include an O-Cloud computing platform orchestrated by a Service Management and Orchestration Framework via an O-2 interface defined by the O-RAN Alliance. The network nodes 710 facilitate direct or indirect connection of user equipment (UE), such as by connecting wireless devices 712*a*, 712*b*, 712*c*, and 712*d* (one or more of which may be generally referred to as UEs 712) to the core network 706 over one or more wireless connections. The network nodes 710 facilitate direct or indirect connection of user equipment (UE), such as by connecting UEs 712*a*, 712*b*, 712*c*, and 712*d* (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunications network 702 may support network slicing to provide different logical networks to different devices that are connected to the telecommunication network 702. For example, the telecommunications network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 714 communicates with the access network 704 to facilitate indirect communication between one or more UEs (e.g., UE 712*c* and/or 712*d*) and network nodes (e.g., network node 710*b*). In some examples, the hub 714 may be a controller, router, content source and analytics, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a VR headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular in if one or more of the UEs are low energy IoT devices.

The hub 714 may have a constant/persistent or intermittent connection to the network node 710*b*. The hub 714 may also allow for a different communication scheme and/or schedule between the hub 714 and UEs (e.g., UE 712*c* and/or 712*d*), and between the hub 714 and the core network 706. In other examples, the hub 714 is connected to the core network 706 and/or one or more UEs via a wired connection. Moreover, the hub 714 may be configured to connect to an M2M service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710*b*. In other embodiments, the hub 714 may be a non-dedicated hub—that is, a device which is capable of operating to route communications between the UEs and network node 710*b*, but which is additionally capable of operating as a communication start and/or end point for certain data channels.

Figure 8:
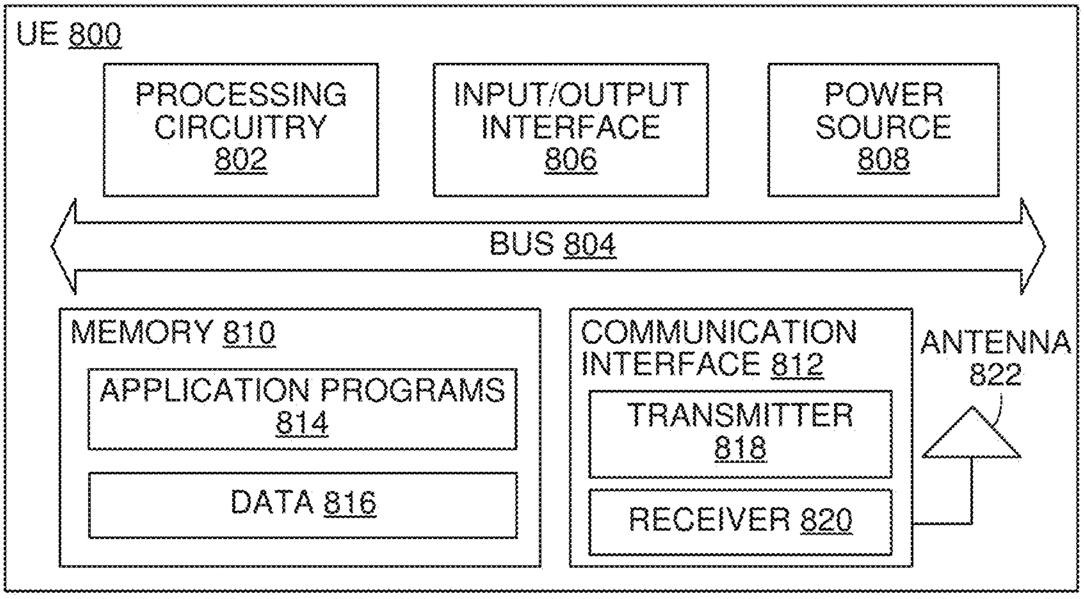
FIG. 8 is a block diagram of a user equipment in accordance with some embodiments.

FIG. 8 shows a UE 800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 802 is configured to process instructions and data and may be configured to implement any sequential state machine operative to execute instructions stored as machine-readable computer programs in the memory 810. The processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 802 may include multiple central processing units (CPUs).

In the example, the input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 808 is structured as a battery or battery pack. Other types of power sources, such as an external power source (e.g., an electricity outlet), photovoltaic device, or power cell, may be used. The power source 808 may further include power circuitry for delivering power from the power source 808 itself, and/or an external power source, to the various parts of the UE 800 via input circuitry or an interface such as an electrical power cable. Delivering power may be, for example, for charging of the power source 808. Power circuitry may perform any formatting, converting, or other modification to the power from the power source 808 to make the power suitable for the respective components of the UE 800 to which power is supplied.

The memory 810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 810 includes one or more application programs 814, such as an operating system, web browser application, a widget, gadget engine, or other application, and corresponding data 816. The memory 810 may store, for use by the UE 800, any of a variety of various operating systems or combinations of operating systems.

The memory 810 may be configured to include a number of physical drive units, such as redundant array of independent disks (RAID), flash memory, USB flash drive, external hard disk drive, thumb drive, pen drive, key drive, highdensity digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 810 may allow the UE 800 to access instructions, application programs and the like, stored on transitory or non-transitory memory media, to off-load data, or to upload data. An article of manufacture, such as one utilizing a communication system may be tangibly embodied as or in the memory 810, which may be or comprise a device-readable storage medium.

The processing circuitry 802 may be configured to communicate with an access network or other network using the communication interface 812. The communication interface 812 may comprise one or more communication subsystems and may include or be communicatively coupled to an antenna 822. The communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, the transmitter 818 and receiver 820 may be coupled to one or more antennas (e.g., antenna 822) and may share circuit components, software or firmware, or alternatively be implemented separately.

In the illustrated embodiment, communication functions of the communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
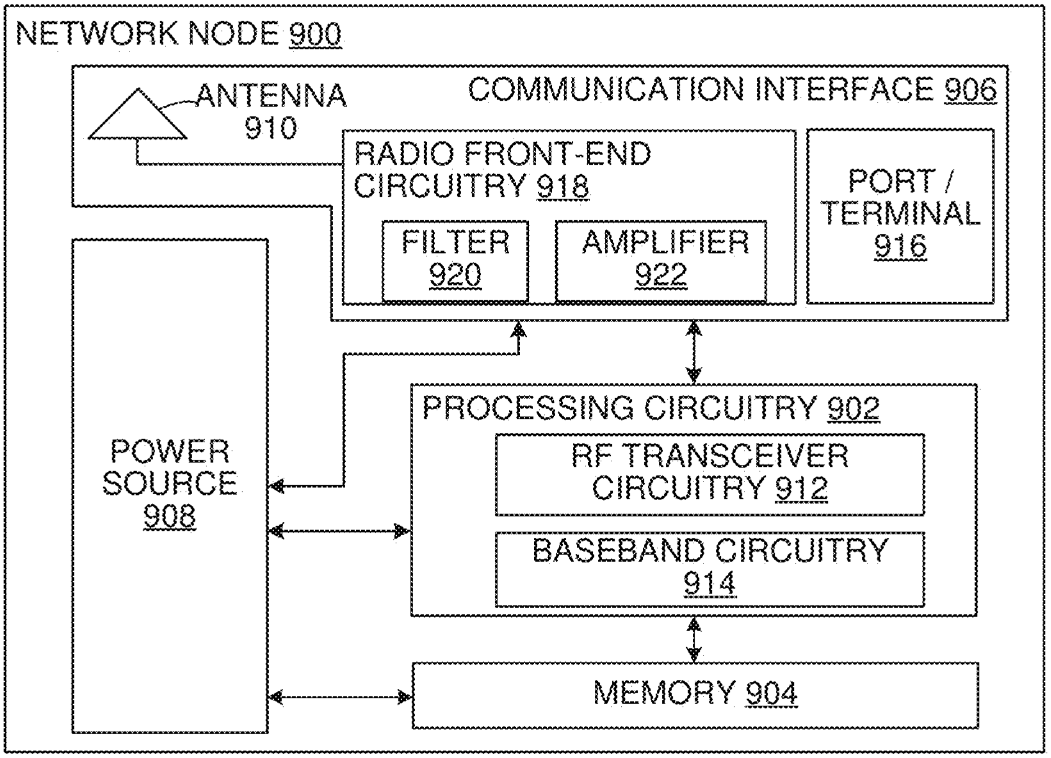
FIG. 9 is a block diagram of a network node in accordance with some embodiments.

FIG. 9 shows a network node 900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs), NR NodeBs (gNBs)), O-RAN nodes, or components of an O-RAN node (e.g., intelligent controller, O-RU, O-DU, O-CU).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 900 includes a processing circuitry 902, a memory 904, a communication interface 906, and a power source 908. The network node 900 may be composed of multiple physically separate components (e.g., a NodeB component and a RNC component, or a BTS component and a BSC component, etc.), which may each have their own respective components. In certain scenarios in which the network node 900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 900 may be configured to support multiple radio access technologies (RATs). In such embodiments, some components may be duplicated (e.g., separate memory 904 for different RATs) and some components may be reused (e.g., a same antenna 910 may be shared by different RATs). The network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

The processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as the memory 904, to provide network node 900 functionality.

In some embodiments, the processing circuitry 902 includes a system on a chip (SOC). In some embodiments, the processing circuitry 902 includes one or more of radio frequency (RF) transceiver circuitry 912 and baseband processing circuitry 914. In some embodiments, the radio frequency (RF) transceiver circuitry 912 and the baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

The memory 904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 902. The memory 904 may store any suitable instructions, data, or information, including a computer program, software, an application including one or more of logic, rules, code, tables, and/or other instructions capable of being executed by the processing circuitry 902 and utilized by the network node 900. The memory 904 may be used to store any calculations made by the processing circuitry 902 and/or any data received via the communication interface 906. In some embodiments, the processing circuitry 902 and memory 904 is integrated.

The communication interface 906 is used in wired or wireless communication of signaling and/or data between a network node, access network, and/or UE. As illustrated, the communication interface 906 comprises port(s)/terminal(s) 916 to send and receive data, for example to and from a network over a wired connection. The communication interface 906 also includes radio front-end circuitry 918 that may be coupled to, or in certain embodiments a part of, the antenna 910. Radio front-end circuitry 918 comprises filters 920 and amplifiers 922. The radio front-end circuitry 918 may be connected to an antenna 910 and processing circuitry 902. The radio front-end circuitry may be configured to condition signals communicated between antenna 910 and processing circuitry 902. The radio front-end circuitry 918 may receive digital data that is to be sent out to other network nodes or UEs via a wireless connection. The radio front-end circuitry 918 may convert the digital data into a radio signal having the appropriate channel and bandwidth parameters using a combination of filters 920 and/or amplifiers 922. The radio signal may then be transmitted via the antenna 910. Similarly, when receiving data, the antenna 910 may collect radio signals which are then converted into digital data by the radio front-end circuitry 918. The digital data may be passed to the processing circuitry 902. In other embodiments, the communication interface may comprise different components and/or different combinations of components.

In certain alternative embodiments, the network node 900 does not include separate radio front-end circuitry 918, instead, the processing circuitry 902 includes radio front-end circuitry and is connected to the antenna 910. Similarly, in some embodiments, all or some of the RF transceiver circuitry 912 is part of the communication interface 906. In still other embodiments, the communication interface 906 includes one or more ports or terminals 916, the radio front-end circuitry 918, and the RF transceiver circuitry 912, as part of a radio unit (not shown), and the communication interface 906 communicates with the baseband processing circuitry 914, which is part of a digital unit (not shown).

The antenna 910 may include one or more antennas, or antenna arrays, configured to send and/or receive wireless signals. The antenna 910 may be coupled to the radio front-end circuitry 918 and may be any type of antenna capable of transmitting and receiving data and/or signals wirelessly. In certain embodiments, the antenna 910 is separate from the network node 900 and connectable to the network node 900 through an interface or port.

The antenna 910, communication interface 906, and/or the processing circuitry 902 may be configured to perform any receiving operations and/or certain obtaining operations described herein as being performed by the network node. Any information, data and/or signals may be received from a UE, another network node and/or any other network equipment. Similarly, the antenna 910, the communication interface 906, and/or the processing circuitry 902 may be configured to perform any transmitting operations described herein as being performed by the network node. Any information, data and/or signals may be transmitted to a UE, another network node and/or any other network equipment.

The power source 908 provides power to the various components of network node 900 in a form suitable for the respective components (e.g., at a voltage and current level needed for each respective component). The power source 908 may further comprise, or be coupled to, power management circuitry to supply the components of the network node 900 with power for performing the functionality described herein. For example, the network node 900 may be connectable to an external power source (e.g., the power grid, an electricity outlet) via an input circuitry or interface such as an electrical cable, whereby the external power source supplies power to power circuitry of the power source 908. As a further example, the power source 908 may comprise a source of power in the form of a battery or battery pack which is connected to, or integrated in, power circuitry. The battery may provide backup power should the external power source fail.

Embodiments of the network node 900 may include additional components beyond those shown in FIG. 9 for providing certain aspects of the network node's functionality, including any of the functionality described herein and/or any functionality necessary to support the subject matter described herein. For example, the network node 900 may include user interface equipment to allow input of information into the network node 900 and to allow output of information from the network node 900. This may allow a user to perform diagnostic, maintenance, repair, and other administrative functions for the network node 900.

Figure 10:
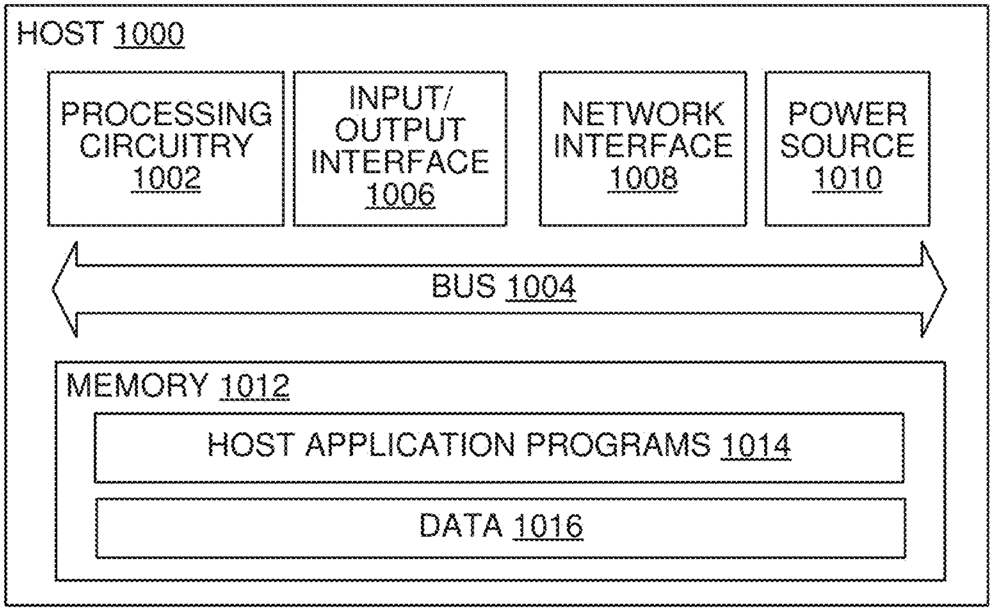
FIG. 10 is a block diagram of a host computer communicating with a user equipment in accordance with some embodiments.

FIG. 10 is a block diagram of a host 1000, which may be an embodiment of the host 716 of FIG. 7, in accordance with various aspects described herein. As used herein, the host 1000 may be or comprise various combinations hardware and/or software, including a standalone server, a blade server, a cloud-implemented server, a distributed server, a virtual machine, container, or processing resources in a server farm. The host 1000 may provide one or more services to one or more UEs.

The host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8 and 9, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of the host 1000 may utilize only a subset or all of the components shown. The host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of a core network. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
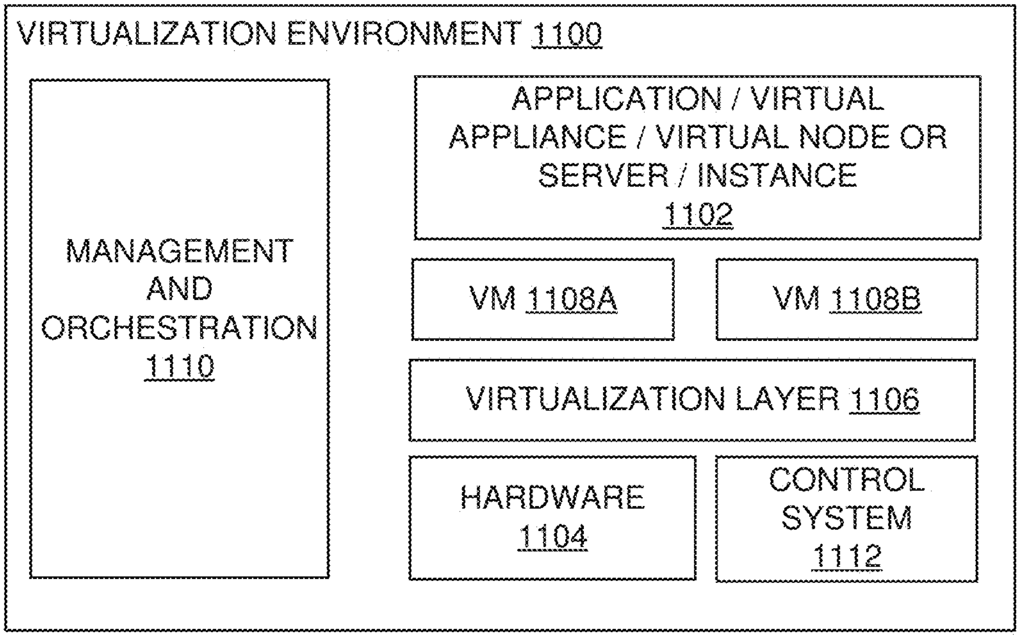
FIG. 11 is a block diagram of a virtualization environment in accordance with some embodiments.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized. In some embodiments, the virtualization environment 1100 includes components defined by the O-RAN Alliance, such as an O-Cloud environment orchestrated by a Service Management and Orchestration Framework via an O-2 interface.

Applications 1102 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs **1108*a* and 1108*b* (one or more of which may be generally referred to as VMs 1108), and/or perform any of the functions, features and/or benefits described in relation with some embodiments described herein. The virtualization layer 1106 may present a virtual operating platform that appears like networking hardware to the VMs 1108**.

The VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1108 may be a software implementation of a physical machine that runs programs as if they were executing on a physical, non-virtualized machine. Each of the VMs 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of the hardware 1104 and corresponds to the application 1102.

Hardware 1104 may be implemented in a standalone network node with generic or specific components. Hardware 1104 may implement some functions via virtualization. Alternatively, hardware 1104 may be part of a larger cluster of hardware (e.g., such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

Figure 12:
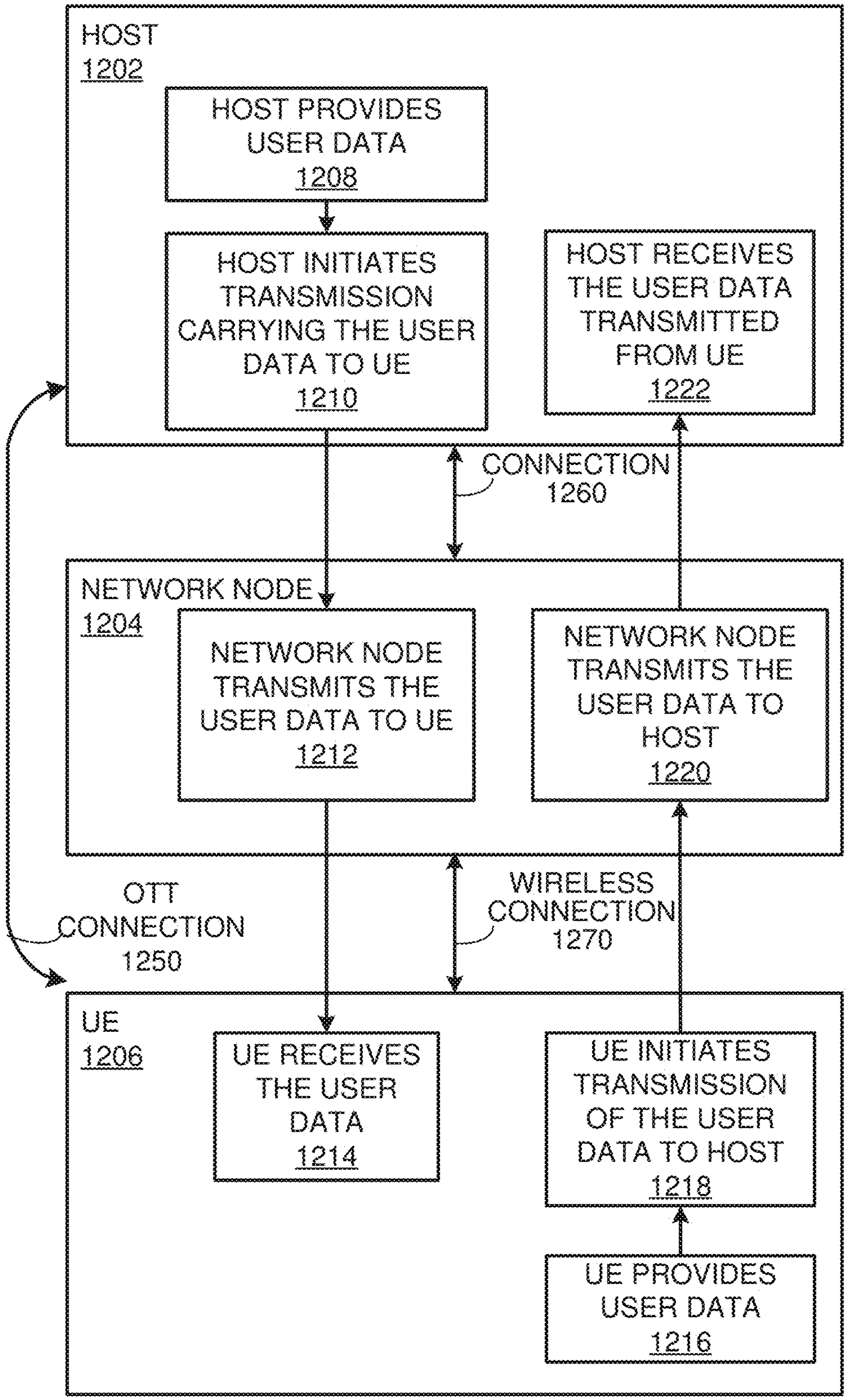
FIG. 12 is a block diagram of a host computer communicating via a base station with a user equipment over a partially wireless connection in accordance with some embodiments.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712*a* of FIG. 7 and/or UE 800 of FIG. 8), network node (such as network node 710*a* of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. The host 1202 also includes software, which is stored in or accessible by the host 1202 and executable by the processing circuitry. The software includes a host application that may be operable to provide a service to a remote user, such as the UE 1206 connecting via an over-the-top (OTT) connection 1250 extending between the UE 1206 and host 1202. In providing the service to the remote user, a host application may provide user data which is transmitted using the OTT connection 1250.

The network node 1204 includes hardware enabling it to communicate with the host 1202 and UE 1206. The connection 1260 may be direct or pass through a core network (like core network 706 of FIG. 7) and/or one or more other intermediate networks, such as one or more public, private, or hosted networks. For example, an intermediate network may be a backbone network or the Internet.

The UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of the host 1202. In the host 1202, an executing host application may communicate with the executing client application via the OTT connection 1250 terminating at the UE 1206 and host 1202. In providing the service to the user, the UE's client application may receive request data from the host's host application and provide user data in response to the request data. The OTT connection 1250 may transfer both the request data and the user data. The UE's client application may interact with the user to generate the user data that it provides to the host application through the OTT connection 1250.

The OTT connection 1250 may extend via a connection 1260 between the host 1202 and the network node 1204 and via a wireless connection 1270 between the network node 1204 and the UE 1206 to provide the connection between the host 1202 and the UE 1206. The connection 1260 and wireless connection 1270, over which the OTT connection 1250 may be provided, have been drawn abstractly to illustrate the communication between the host 1202 and the UE 1206 via the network node 1204, without explicit reference to any intermediary devices and the precise routing of messages via these devices.

As an example of transmitting data via the OTT connection 1250, in step 1208, the host 1202 provides user data, which may be performed by executing a host application. In some embodiments, the user data is associated with a particular human user interacting with the UE 1206. In other embodiments, the user data is associated with a UE 1206 that shares data with the host 1202 without explicit human interaction. In step 1210, the host 1202 initiates a transmission carrying the user data towards the UE 1206. The host 1202 may initiate the transmission responsive to a request transmitted by the UE 1206. The request may be caused by human interaction with the UE 1206 or by operation of the client application executing on the UE 1206. The transmission may pass via the network node 1204, in accordance with the teachings of the embodiments described throughout this disclosure. Accordingly, in step 1212, the network node 1204 transmits to the UE 1206 the user data that was carried in the transmission that the host 1202 initiated, in accordance with the teachings of the embodiments described throughout this disclosure. In step 1214, the UE 1206 receives the user data carried in the transmission, which may be performed by a client application executed on the UE 1206 associated with the host application executed by the host 1202.

In some examples, the UE 1206 executes a client application which provides user data to the host 1202. The user data may be provided in reaction or response to the data received from the host 1202. Accordingly, in step 1216, the UE 1206 may provide user data, which may be performed by executing the client application. In providing the user data, the client application may further consider user input received from the user via an input/output interface of the UE 1206. Regardless of the specific manner in which the user data was provided, the UE 1206 initiates, in step 1218, transmission of the user data towards the host 1202 via the network node 1204. In step 1220, in accordance with the teachings of the embodiments described throughout this disclosure, the network node 1204 receives user data from the UE 1206 and initiates transmission of the received user data towards the host 1202. In step 1222, the host 1202 receives the user data carried in the transmission initiated by the UE 1206.

One or more of the various embodiments improve the performance of OTT services provided to the UE 1206 using the OTT connection 1250, in which the wireless connection 1270 forms the last segment. More precisely, the teachings of these embodiments may enable the UE to perform random access to a cell for which the UE already has an activated TCI state, which can reduce the mobility interruption time since by selecting in random access the beam for which associated TCI state is already activated the UE is ready to receive PDCCH transmitted on that spatial direction. In some examples, there would be no need to select another beam and perform additional measurements or further synchronization procedures towards a beam for which the TCI state is not activated. In additional or alternative examples, the UE would not need to perform fine time tracking and acquire full timing information of the LTM candidate cell during random access, since the UE selects an SSB for which the UE has previously received a TCI state activation indication.

In an example scenario, factory status information may be collected and analyzed by the host 1202. As another example, the host 1202 may process audio and video data which may have been retrieved from a UE for use in creating maps. As another example, the host 1202 may collect and analyze real-time data to assist in controlling vehicle congestion (e.g., controlling traffic lights). As another example, the host 1202 may store surveillance video uploaded by a UE. As another example, the host 1202 may store or control access to media content such as video, audio, VR or AR which it can broadcast, multicast or unicast to UEs. As other examples, the host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1250 between the host 1202 and UE 1206, in response to variations in the measurement results. The measurement procedure and/or the network functionality for reconfiguring the OTT connection may be implemented in software and hardware of the host 1202 and/or UE 1206. In some embodiments, sensors (not shown) may be deployed in or in association with other devices through which the OTT connection 1250 passes; the sensors may participate in the measurement procedure by supplying values of the monitored quantities exemplified above, or supplying values of other physical quantities from which software may compute or estimate the monitored quantities. The reconfiguring of the OTT connection 1250 may include message format, retransmission settings, preferred routing etc.; the reconfiguring need not directly alter the operation of the network node 1204. Such procedures and functionalities may be known and practiced in the art. In certain embodiments, measurements may involve proprietary UE signaling that facilitates measurements of throughput, propagation times, latency and the like, by the host 1202. The measurements may be implemented in that software causes messages to be transmitted, in particular empty or 'dummy' messages, using the OTT connection 1250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method of operating a communication device, the method comprising:

receiving a MAC Control Element (MAC CE) indicating an activation of a transmission configuration indicator (TCI) state of a Layer 1/Layer 2 Triggered Mobility (LTM) candidate cell;

activating the TCI state of the LTM candidate cell;

subsequent to activating the TCI state of the LTM candidate cell, selecting a beam of the LTM candidate cell as part of a Contention Based Random Access (CBRA) procedure with the LTM candidate cell, wherein the beam is associated with the activated TCI state, wherein selecting the beam of the LTM candidate cell is performed prior to a first preamble transmission attempt of the CBRA procedure;

selecting a preamble and a random access channel (RACH) resource based on the beam of the LTM candidate cell; and transmitting the preamble to the RACH resource, wherein transmitting the preamble to the RACH resource comprises a first preamble transmission attempt using the beam.

2. The method of claim 1, wherein selecting the beam comprises selecting at least one of:

a reference signal (RS);

a synchronization signal (SS);

a synchronization signal block (SSB);

a channel state information RS (CSI-RS); and a mobility RS (MRS).

3. The method of claim 1, wherein selecting the beam of the LTM candidate cell comprises selecting a beam that is associated with the TCI state and that is configured as a quasi-co-location (QCL) source of the TCI state.

4. The method of claim 1, wherein selecting the beam of the LTM candidate cell comprises selecting the beam from a plurality of beams of the LTM candidate cell based on a measurement associated with the beam.

5. The method of claim 1, wherein selecting the beam of the LTM candidate cell comprises selecting the beam from a plurality of beams of the LTM candidate cell based on the beam being used for a previous random access procedure.

6. The method of claim 1, wherein selecting the beam of the candidate cell comprises selecting the beam in response to a predetermined number of failed preamble transmission attempts of the CBRA procedure.

7. The method of claim 1, wherein activating the TCI state of the candidate cell comprises activating the TCI state of the LTM candidate cell while connected to a source cell that is separate from the LTM candidate cell.

8. The method of claim 1, further comprising, subsequent to activating the TCI state of the candidate cell, determining to perform the CBRA procedure based on at least one of:

receiving a Layer 1/Layer 2 triggered mobility, LTM, cell switch command;

receiving a handover command;

applying a handover command in response to fulfillment of a conditional handover execution condition;

applying a handover command in response to fulfillment of a LTM execution condition; or initiation of a re-establishment procedure.

9. A communication device comprising:

one or more processors;

a memory storing instructions which, when executed by the one or more processors cause the communication device to:

receive a MAC Control Element (MAC CE) indicating an activation of a transmission configuration indicator (TCI) state of a Layer 1/Layer 2 Triggered Mobility (LTM) candidate cell;

activate the TCI, state of the LTM candidate cell;

subsequent to activating the TCI state of the LTM candidate cell, select a beam of the LTM candidate cell as part of a Contention Based Random Access (CBRA) procedure with the LTM candidate cell, wherein the beam is associated with the activated TCI state, wherein the beam is associated with the activated TCI state, wherein selecting the beam of the LTM candidate cell is performed prior to a first preamble transmission attempt of the CBRA procedure;

select a preamble and a random access channel (RACH) resource based on the beam of the LTM candidate cell; and transmit the preamble to the RACH resource, wherein transmitting the preamble to the RACH resource comprises a first preamble transmission attempt using the beam.

10. The communication device of claim 9, wherein selecting the beam comprises selecting at least one of:

a reference signal (RS);

a synchronization signal (SS);

a synchronization signal block (SSB);

a channel state information (CSI-RS); and a mobility RS (MRS).

11. The communication device of claim 9, wherein selecting the beam of the LTM candidate cell comprises selecting a beam that is associated with the TCI state and that is configured as a quasi-co-location (QCL) source of the TCI state.

12. The communication device of claim 9, wherein selecting the beam of the LTM candidate cell comprises selecting the beam from a plurality of beams of the LTM candidate cell based on at least one of:

a measurement associated with the beam;

the beam being associated with an active TCI state; or the beam being used for a previous random access procedure.

13. The communication device of claim 9, wherein selecting the beam of the candidate cell comprises selecting the beam in response to a predetermined number of failed preamble transmission attempts of the CBRA procedure.

14. The communication device of claim 9, wherein activating the TCI state of the candidate cell comprises activating the TCI state of the LTM candidate cell while connected to a source cell that is separate from the LTM candidate cell.

15. The communication device of claim 9, wherein the instructions, when executed by the one or more processors, further cause the communication device to:

subsequent to activating the TCI state of the candidate cell, determine to perform the CBRA procedure based on at least one of:

receiving a Layer 1/Layer 2 triggered mobility (LTM) cell switch command;

receiving a handover command;

applying a handover command in response to fulfillment of a conditional handover execution condition;

applying a handover command in response to fulfillment of a LTM execution condition; or initiation of a re-establishment procedure.

16. A non-transitory computer-readable media storing instruction which, when executed by processing circuitry of a communication device, cause the communication device to perform operations comprising:

receiving a MAC Control Element (MAC CE) indicating an activation of a transmission configuration indicator (TCI) state of a Layer 1/Layer 2 Triggered Mobility (LTM) candidate cell;

activating the TCI, state of the LTM candidate cell;

subsequent to activating the TCI state of the LTM candidate cell, selecting a beam of the LTM candidate cell as part of a Contention Based Random Access (CBRA) procedure with the LTM candidate cell, wherein the beam is associated with the activated TCI state, wherein selecting the beam of the LTM candidate cell is performed prior to a first preamble transmission attempt of the CBRA procedure;

selecting a preamble and a random access channel (RACH) resource based on the beam of the LTM candidate cell; and transmitting the preamble to the RACH resource, wherein transmitting the preamble to the RACH resource comprises a first preamble transmission attempt using the beam.

* * * * *